Sept. 8, 1931. W. H. MARTIN 1,822,664
DIAGRAPHIC TRACING MACHINE
Filed June 29, 1929 2 Sheets-Sheet 1
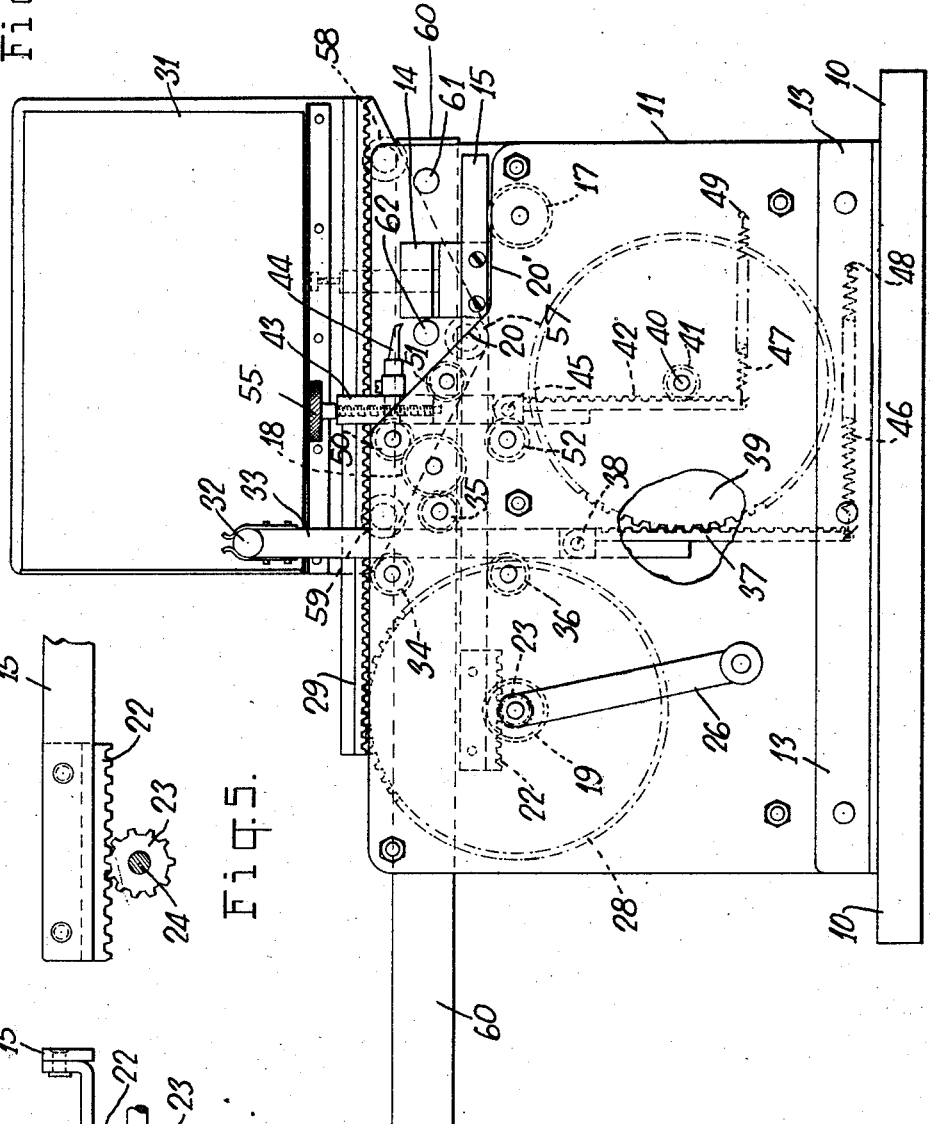
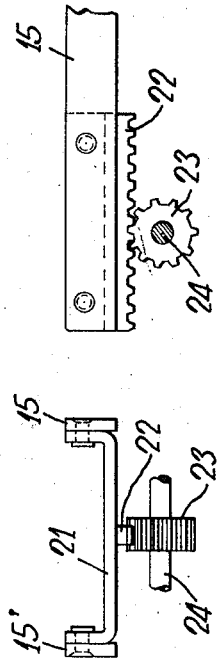
INVENTOR.
Walter H. Martin
BY Warfield & Watson
ATTORNEYS.

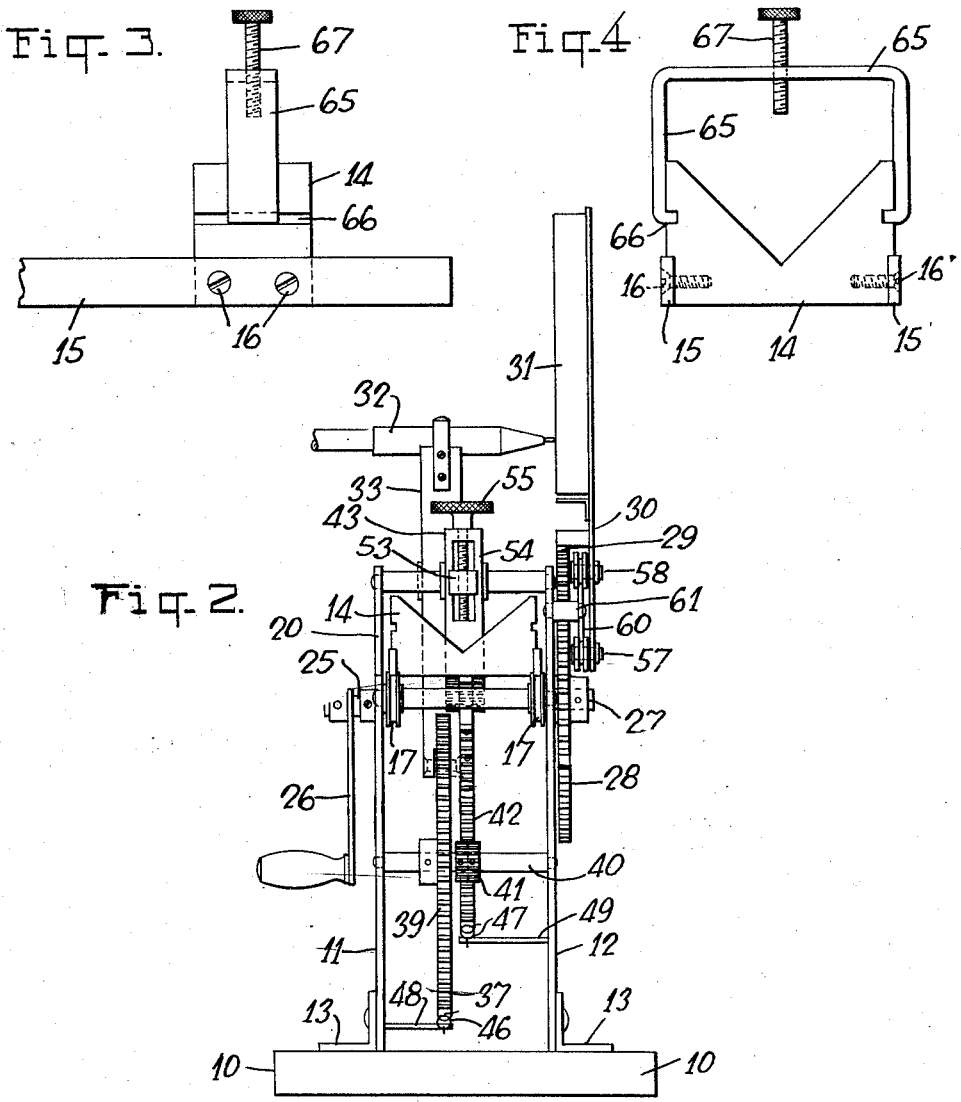

Patented Sept. 8, 1931

1,822,664

UNITED STATES PATENT OFFICE

WALTER HENRY MARTIN, OF PLAINFIELD, NEW JERSEY, ASSIGNOR TO CARBOLOY COMPANY, INC., OF NEW YORK, N. Y., A CORPORATION OF NEW YORK

DIAGRAPHIC TRACING MACHINE

Application filed June 29, 1929. Serial No. 374,629.

This invention relates to diagraphic tracing machines and particularly to machines for tracing irregular forms which lie in a plane and recording the same on a desired magnified scale.

The invention has for its object generally, an improved construction and arrangement of parts, which is efficient, economical and readily manufactured.

More specifically, it is an object of the present invention to provide a tracing machine adapted to trace an irregular curve in a plane and reproduce it on an enlarged scale, with a high degree of precision and without vibrations, or the distortion incident thereto.

It is also an object to produce a machine of the character described which is relatively rigid, long-lived and adapted automatically to compensate for the wear of parts.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention reference should be had to the following detailed description taken in connection with the accompanying drawings, in which:

Fig. 1 is a view mainly in side elevation, showing a machine constructed in accordance with the present invention, the position of certain parts hidden by the frame being shown in dotted lines;

Fig. 2 is an end elevation of the machine shown in Fig. 1;

Figs. 3 and 4 show respectively side and end elevations of a vise for supporting the object to be traced which is employed in the present invention; and Figs. 5 and 6 show respectively side and end elevations of the rack mechanism which adjusts the vise.

Referring now to the drawings, and particularly to Figs. 1 and 2, 10 denotes a base having secured thereto a pair of spaced upright parallel plates 11 and 12 which comprise the frame of the machine of the present invention, these plates being secured to the base in any convenient manner, for example by means of the angle-irons shown at 13.

A vise or supporting block 14 for the object whose form is to be traced, is disposed between the plates 11 and 12 and supported by a pair of parallel rods or beams 15 and 15', which are secured to the vise by any suitable means, for example, screws, as shown at 16 and 16'. These rods or beams are movably supported at a plurality of points by means of three sets of idlers or sheaves as shown respectively at 17, 18, and 19, these sheaves being alternately disposed on opposite sides of the rods.

As thus shown, the block 14 is mounted between the rods 15 and 15' near one end and is adapted to have a limited horizontal movement back and forth adjacent the top of the frame of the machine; the frame-plate 11 being preferably cut away for a limited distance, in order that the block 14 may be more readily accessible. This cutting away causes the frame to have an oblique top portion at 20 adjacent the block 14 and a horizontally depressed portion 20'' extending adjacently to the rod 15.

In order that the rods may be readily mounted, they are united by a yoke 21 which extends between the same at the end opposite to that at which the block 14 is secured. This yoke has on its under side a rack 22 which engages with a pinion 23 secured to a shaft 24 which is journalled in the plates 11 and 12 and has a trunnion 25 extending at one side to which the crank 26 is secured for actuating the rack and moving horizontally the block 14 in the manner desired.

The shaft 24 has a second trunnion projecting beyond the frame plate 12 as shown at 27, to which is secured one of the main magnifying gears 28 that engages and meshes with a rack 29 which is mounted to be reciprocated horizontally adjacent the upper edge of the frame plate 12; this rack being secured in a manner hereinafter more fully described, to a plate 30 which supports a paper-pad or plaque 31 on which the magnified contour of the form to be traced is described by a recording stylus 32. This latter is, in turn, supported in the upper end of a reciprocating plunger 33, which reciprocates between and is guided by a plurality of idlers or sheaves 34, 35 and 36 which engage the plunger alternately on opposite sides and constrain its motion so as to be a limited vertical one. The lower end of the plunger has a rack 37 secured thereto in any convenient manner, for example, by means of a pivot as shown at 38. This rack is adapted to engage with a magnifying gear 39 that is secured to the shaft 40, the latter having a pinion 41 which engages with the rack 42 of a plunger 43 that carries the tracing stylus 44 adjacent the block 14. The rack 42 is secured to the plunger 43 in any convenient manner, for example, by a pivot 45. In order that the pivotally secured racks 37 and 42 may tightly engage at all times with their respective gears and avoid slippage or lost motion, the lower ends of each of these racks are adapted to be biased or yieldingly held drawn against their respective gears. This is readily accomplished by means of springs at 46 and 47 which engage respectively with the lower ends of the racks 37 and 42, the other ends of the springs being secured to the frames in any convenient manner, for example, by means of the studs or posts 48 and 49. The plunger 43 is constrained to have limited vertical movement in substantially the same manner as the plunger 33. To this end, there is shown three sets of idlers or sheaves 50, 51 and 52 secured in the frame plates 11 and 12, the sheaves being adapted to engage alternately on opposite points of the plunger.

The tracing stylus 44 may be secured in the plunger 43 in any convenient manner, but is preferably adjustably secured therein and is here shown as secured to a small block 53 which slides between parallel ways 54 cut like a slot in the upper end of the plunger. This block is engaged by the thumb screw 55 secured vertically in the upper end of the plunger and is adapted to adjust the block when turned, in order to bring the stylus 44 to a desired initial position with reference to the vise-block 14.

By this arrangement, it is seen that when the tracing stylus 44 is made to move vertically and following the contour of the object to be traced, the stylus 44 causes the plunger 43 to reciprocate and rotate the pinion 41. This in turn causes rotation of the gear 39 which produces reciprocation of the plunger 33. This step-up gearing accomplishes the magnification of the movement executed by the tracing stylus, so that the recording stylus 32 is made to reproduce the vertical movements of stylus 44 magnified a pre-determined amount. The scale of the magnification of the motion of the vertical plunger, is preferably, though not necessarily, the same as the magnification employed for the motion of the horizontally moving plungers. Where the scale of magnification for both the horizontal and vertical motions is the same, it is seen that the stylus 32, moving vertically on the horizontally moving pad or plaque 31, reproduces a contour identically similar to the contour of the object being traced and magnified uniformly by the ratio of the magnifying gears.

In order that the support 30 for the recording pad or plaque 31 may be rigidly supported in a vertical plane and yet be free to move to a limited extent in a horizontal line, the lower end of the same is made to extend downwardly adjacent the rear of the frame-plate 12, this extension terminating in an inverted triangular contour, at the vertices of which are secured three idlers or sheaves 57, 58 and 59 which engage respectively with alternate upper and lower edges of a straight bar or rod 60 that is secured at the rear by means of a pair of distance columns 61 and 62 to the upper edge of the frame-plate 12.

When it is desired to reproduce on an enlarged scale the contour that lies in a plane of the form to be traced, this form is first placed in the vise block 14 and secured therein. This securing may be accomplished in any suitable manner, for example, by the U-strap 65 shown in Figs. 3 and 4; this strap having inturned ends which engage with the grooves 66 formed in the sides of the block 14. This U-strap has a screw 67 in threaded engagement with a suitable central opening, which is adapted to be screwed downwardly to engage with the form and hold it securely in the vise-block.

Assuming that the form to be traced is that of a die opening of a die-disk used for drawing wire, the die disk is placed on the vise-block so that the opening is horizontal, the U-strap put in place, and the screw 67 turned until the die disk is securely fastened in place. The thumb screw 55 is then manipulated so as to bring the tracing stylus 44 to the level of the opening in the die disk. The crank 26 is then grasped and turned, so as to bring the die opening in engagement with the tracing stylus. By continued turning of the crank 26, it is seen that the tracing stylus 44 is caused to follow the contour of the die opening and to execute limited vertical movement as it follows this contour. These movements are, of course, transferred to the recording stylus 32 magnified a predetermined amount. At the same time that the stylus 32 is executing vertical movements, the pad or plaque 31 is executing a corresponding horizontal movement, so that as the tracing stylus 44 moves a given distance into the die opening, the recording stylus 32 will move relatively a horizontal distance which is magnified in a desired ratio.

It is seen that the rectilinear motion of each of the reciprocating parts here provided is determined by a pair of sheaves bearing on one side of the moving element, and a third which bears on the other, thereby keeping the moving element always in tight engagement with the sheaves in order definitely to determine its line of movement. Also, it is seen that by the use of pivoted racks yieldingly held in engagement with their gears or pinions, substantially all chance for the racks to slip or jump over a gear-tooth is avoided, thereby insuring the reproduction of the contour which is to be traced with a high degree of precision.

It is also seen that since the use of levers for accomplishing the desired magnification is avoided, the lost motion which generally occurs at their pivot points is avoided; also the liability of vibration incident to the employment of long rods is avoided. It is also seen that the force of gravity constantly pulls all the rotating parts in the present machine downwardly, which automatically compensates for the wear in the rotating parts here employed.

Since certain changes may be made in the above construction and different embodiments of the invention could be made without departing from the scope hereof, it is intended that all matter contained in the above description or shown in the accompanying drawings shall be interpreted as illustrative and not in a limiting sense.

Having described my invention, what I claim as new and desire to secure by Letters Patent is:

1. In a diagraphic tracing machine, the combination comprising a frame, a pair of plungers supported by said frame adapted to execute relatively parallel motions related in accordance with a predetermined ratio, a second pair of relatively parallel moving plungers supported by said frame and adapted to have motions related in accordance with a predetermined ratio, said second pair of parallel plungers arranged to move at right angles to the first pair of parallel moving plungers, means for associating the plungers of one set to trace and reproduce one component of the contour in a plane of the form to be traced, and means for associating the remaining plungers to reproduce another component of said form on a scale in accordance with said ratios.

2. In a diagraphic tracing machine, the combination comprising a frame, a pair of vertically moving plungers, mechanical means connecting said plungers to execute relative movements related in accordance with a predetermined ratio, a tracing stylus carried by one of said plungers, a recording stylus carried by the other of said plungers, a pair of horizontally moving plungers, mechanical means connecting said plungers to execute relative movements related in accordance with a predetermined ratio, a support for a form to be traced secured to one of said horizontally moving plungers and arranged to cooperate with said tracing stylus, and a support for a record-receiving impression secured to the other horizontally moving plunger and arranged to cooperate with the recording stylus.

3. In a diagraphic tracing machine, the combination comprising a frame, a pair of vertically moving plungers supported by said frame and provided with racks, rigidly connected gears supported by said frame arranged to engage with said racks respectively and relate their motions in a predetermined ratio, a pair of horizontally moving plungers supported by said frame and provided with racks, a second pair of rigidly connected gears supported by said frame and arranged to engage with said second set of racks respectively to relate their motion in accordance with a predetermined ratio, tracing and recording styluses carried respectively by the plungers of one of said pairs, supports adapted respectively for a form to be traced and a record-receiving plaque carried respectively by the plungers of the other of said pairs.

4. In a diagraphic tracing machine, the combination comprising a frame, a pair of vertically moving plungers supported by said frame and each having a rack, a rigidly connected pinion and gear supported by said frame and arranged to engage respectively with said racks whereby the motion of said pinion-engaging plunger is reproduced by the other on a magnified scale, a pair of horizontally moving plungers supported by said frame and each having a rack, a rigidly connected gear and pinion supported by said frame and arranged to engage respectively with said second set of racks whereby the motion of the pinion-engaging plunger is reproduced by the other on a magnified scale, a tracing stylus carried by one of said pinion-engaging plungers, a support for a form to be traced carried by the other of said pinion-engaging plungers, a tracing stylus carried by the gear engaging plunger associated with the first named stylus supporting plunger, and a support for a record-receiving plaque secured to the plunger associated with the other support-sustaining plunger.

5. In a diagraphic tracing machine, the combination comprising a frame, a pair of vertically moving plungers supported by said frame, each having an actuating rack, rigidly connected gears pivoted in said frame and adapted to engage with said racks respectively, a pair of horizontally moving plungers supported by said frame, each having an actuating rack, a second pair of rigidly connected gears pivoted in said frame and adapted to engage respectively with the the racks of said horizontally moving plungers, recording and reproducing styluses associated respectively with said vertically moving plungers, and supports adapted respectively to hold a form to be traced and a record receiving plaque associated respectively with said horizontally moving plungers.

6. In a diagraphic tracing machine, the combination comprising a frame, a pair of vertically moving plungers supported by said frame, each having an actuating rack, rigidly connected gears pivoted in said frame and adapted to engage with said racks respectively, a pair of horizontally moving plungers supported by said frame, each having an actuating rack, a second pair of rigidly connected gears pivoted in said frame and adapted to engage respectively with the racks of said horizontally moving plungers, recording and reproducing styluses associated respectively with said vertically moving plungers, supports adapted respectively to hold a form to be traced and a record-receiving plaque which are associated respectively with said horizontally moving plungers, and means associated with the form-supporting plunger for urging the same into engagement with the tracing stylus.

7. In a diagraphic tracing machine, the combination comprising a frame, a pair of vertically moving plungers supported by said frame, each having an actuating rack, a rigidly connected pinion and gear pivoted in said frame and adapted to engage with said racks respectively, a pair of horizontally moving plungers supported by said frame, each having an actuating rack, a second rigidly connected pinion and gear pivoted in said frame and adapted to engage with said second set of racks, a recording stylus associated with the pinion engaging vertical moving plunger, a reproducing stylus associated with the other vertically moving plunger, a support adapted to hold a form to be traced associated with the pinion engaging horizontally moving plunger, a record receiving plaque associated with the other horizontally moving plunger, and a crank connected to the rack-engaging pinion and gear of said horizontal plungers adapted to urge a form to be reproduced when supported by said first named support into engagement with said tracing stylus.

8. In a diagraphic tracing machine, the combination comprising a frame, a reciprocating plunger, a pair of idler sheaves secured in said frame and adapted to engage with spaced points on one side of said plunger, a third idler sheave adapted to engage with an intermediate point on the opposite side of said plunger, a rack connected to said plunger, an actuating gear pivoted in said frame and adapted to engage with said plunger, and means associated therewith to bias said rack in constant engagement with said gear.

9. In a diagraphic tracing machine, the combination comprising a frame, a vertically moving plunger associated with said frame, a pair of idler sheaves mounted in said frame and adapted to engage with spaced points on one side of said plunger, a third idler sheave adapted to engage with an intermediate point on the other side of said plunger, a rack secured to one end of said plunger, an actuating gear engaging with said rack, and resilient means associated with said rack and arranged to urge the same into engagement with said gear.

10. In a diagraphic tracing machine, the combination comprising a frame, a vertically moving stylus-supporting plunger associated with said frame, a pair of idlers supported by said frame and adapted to engage with spaced points on one side of said plunger, a third idler supported by said frame and adapted to engage with the other side of said plunger at an intermediate point, a rack pivoted to the lower end of said plunger, a gear engaging with said rack, spring means engaging with said rack to urge the same into yielding engagement with said gear, sliding ways in the upper end of said plunger, a stylus supporting block disposed in said ways, and means associated with said plunger for adjusting said block within said ways.

11. In a diagraphic tracing machine, the combination comprising a frame, a horizontally moving plunger having a pair of spaced bars, a pair of spaced sets of sheaves engaging spaced points on the under side of each of said bars, a third set of idlers engaging intermediate points on the upper side of said bars, a supporting block secured between said rods at one end, a bridge having a rack disposed between said bars at the other end, and a driving pinion pivoted in said frame and arranged to engage with said rack.

12. In a diagraphic tracing machine, the combination with a frame comprising a pair of spaced plates, of a horizontally moving plunger, a record-receiving plaque support secured to said plunger and terminating at its lower end in an inverted triangle, idler sheaves secured to said support substantially at the vertices of said triangle, a flat beam secured on the outer side of one of said frame plates, said beam being embraced by the three idlers of said support and adapted to serve as a track for the movement of said support, and an actuating gear supported by said frame and adapted to engage with the rack on said plunger.

13. In a diagraphic tracing machine, the combination comprising a frame, a pair of plungers supported by said frame adapted to execute relatively parallel motions related in accordance with a predetermined ratio, a second pair of relatively parallel moving plungers supported by said frame and adapted to have motions related in accordance with a predetermined ratio, said second pair of parallel plungers arranged to move at a constant angle to the first pair of parallel moving plungers, means for associating the plungers of one set to trace and reproduce one component of the contour in a plane of the form to be traced, and means for associating the remaining plungers to reproduce another component of said form on a scale in accordance with said ratios.

14. In a diagraphic tracing machine, the combination comprising a frame, a pair of vertically moving plungers, means mechanically connecting said plungers to execute relative movements related in accordance with a predetermined ratio, a pair of horizontally disposed plungers, means mechanically connecting said plungers to execute relative movements related in accordance with a predetermined ratio, tracing and recording styluses carried respectively by the plungers of one of said pairs, and supports adapted respectively for a form to be traced and a record receiving plaque carried respectively by the plungers of the other of said pairs.

In testimony whereof I affix my signature.

WALTER HENRY MARTIN.